US010795679B2

(12) United States Patent
Weimer

(10) Patent No.: US 10,795,679 B2
(45) Date of Patent: Oct. 6, 2020

(54) MEMORY ACCESS INSTRUCTIONS THAT INCLUDE PERMISSION VALUES FOR ADDITIONAL PROTECTION

(71) Applicant: Red Hat, Inc., Raleigh, NC (US)

(72) Inventor: Florian Weimer, Stuttgart (DE)

(73) Assignee: Red Hat, Inc., Raleigh, NC (US)

( * ) Notice: Subject to any disclaimer, the term of this patent is extended or adjusted under 35 U.S.C. 154(b) by 116 days.

(21) Appl. No.: 16/002,839

(22) Filed: Jun. 7, 2018

(65) Prior Publication Data

US 2019/0377574 A1    Dec. 12, 2019

(51) Int. Cl.
*G06F 9/30* (2018.01)
*G06F 21/62* (2013.01)
*G06F 21/52* (2013.01)

(52) U.S. Cl.
CPC ...... *G06F 9/30043* (2013.01); *G06F 21/6218* (2013.01)

(58) Field of Classification Search
CPC ............. G06F 9/30043; G06F 21/6218; G06F 21/121; G06F 21/51; G06F 21/52; G06F 21/54; G06F 12/1416; G06F 12/1009; G06F 9/44589; G06F 9/468
USPC ........................................................ 712/214
See application file for complete search history.

(56) References Cited

U.S. PATENT DOCUMENTS

| | | | | |
|---|---|---|---|---|
| 5,740,441 A | * | 4/1998 | Yellin ................. | G06F 9/44589 714/E11.211 |
| 6,336,178 B1 | * | 1/2002 | Favor .................. | G06F 7/74 712/23 |
| 7,434,091 B1 | * | 10/2008 | Karr ..................... | G06F 3/0614 711/114 |
| 9,778,869 B2 | | 10/2017 | Farrell et al. | |
| 9,779,034 B2 | | 10/2017 | Jaeger | |

(Continued)

OTHER PUBLICATIONS

Ledwith et al., "Introducing flexibility in digital circuit evolution: exploiting undefined values in binary truth tables," Proceedings of the 9th International Conference Evolvable Systems: From Biology to Hardware, ICES 2010, vol. 6274 of Lecture Notes in Computer Science, pp. 25-36, York, Sep. 6-8, 2010.

(Continued)

*Primary Examiner* — Aimee Li
*Assistant Examiner* — Shawn Doman
(74) *Attorney, Agent, or Firm* — Lowenstein Sandler LLP

(57) ABSTRACT

Systems and methods for executing an augmented program instruction are described. An example method may include a central processing unit receiving an executable program instruction. The central processing unit determines that the executable program instruction is an augmented program instruction. The augmented program instruction may include operands that provide input for an operation to be performed and an additional operand specifying a validation permission value to be compared to a permission value associated with a page table entry referenced by the augmented program instruction. Upon determining that the validation permission value specified in the augmented program instruction matches the permission value associated with the page table entry referenced by the augmented program instruction, the central processing unit performing the operation specified by the augmented program instruction.

7 Claims, 10 Drawing Sheets

(56) References Cited

U.S. PATENT DOCUMENTS

| | | | |
|---|---|---|---|
| 2004/0243823 A1* | 12/2004 | Moyer | G06F 21/316 |
| | | | 726/27 |
| 2007/0083770 A1* | 4/2007 | Heasman | G06F 21/51 |
| | | | 713/190 |
| 2010/0107243 A1* | 4/2010 | Moyer | G06F 12/1416 |
| | | | 726/21 |
| 2015/0186299 A1* | 7/2015 | Caprioli | G06F 12/1458 |
| | | | 711/163 |
| 2015/0186659 A1* | 7/2015 | Leslie-Hurd | G06F 12/0875 |
| | | | 726/1 |
| 2018/0095902 A1* | 4/2018 | Lemay | G06F 12/1466 |

OTHER PUBLICATIONS

Washington.edu; "Tri-state gates," 2001.

\* cited by examiner

MEMORY ACCESS INSTRUCTIONS THAT INCLUDE PERMISSION VALUES FOR ADDITIONAL PROTECTION

TECHNICAL FIELD

This disclosure relates to computer systems, and more particularly, to generating and executing an augmented program instruction. The augmented program instruction determines whether an associated permission value matches permission values associated with a memory address referenced by the augmented program instruction.

BACKGROUND

Computer programs written in high-level programming languages, such as Java, may be converted to a platform-specific set of instructions by a two-stage process. During a first stage, a compiler may translate source code written in the high level programming language into an interim representation, such as "bytecode." During the second stage, the bytecode may be translated into a platform-specific set of instructions by an interpreter, such as, for example, a Java virtual machine (JVM). The platform-specific set of instructions may be executed by a central processing unit (CPU).

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
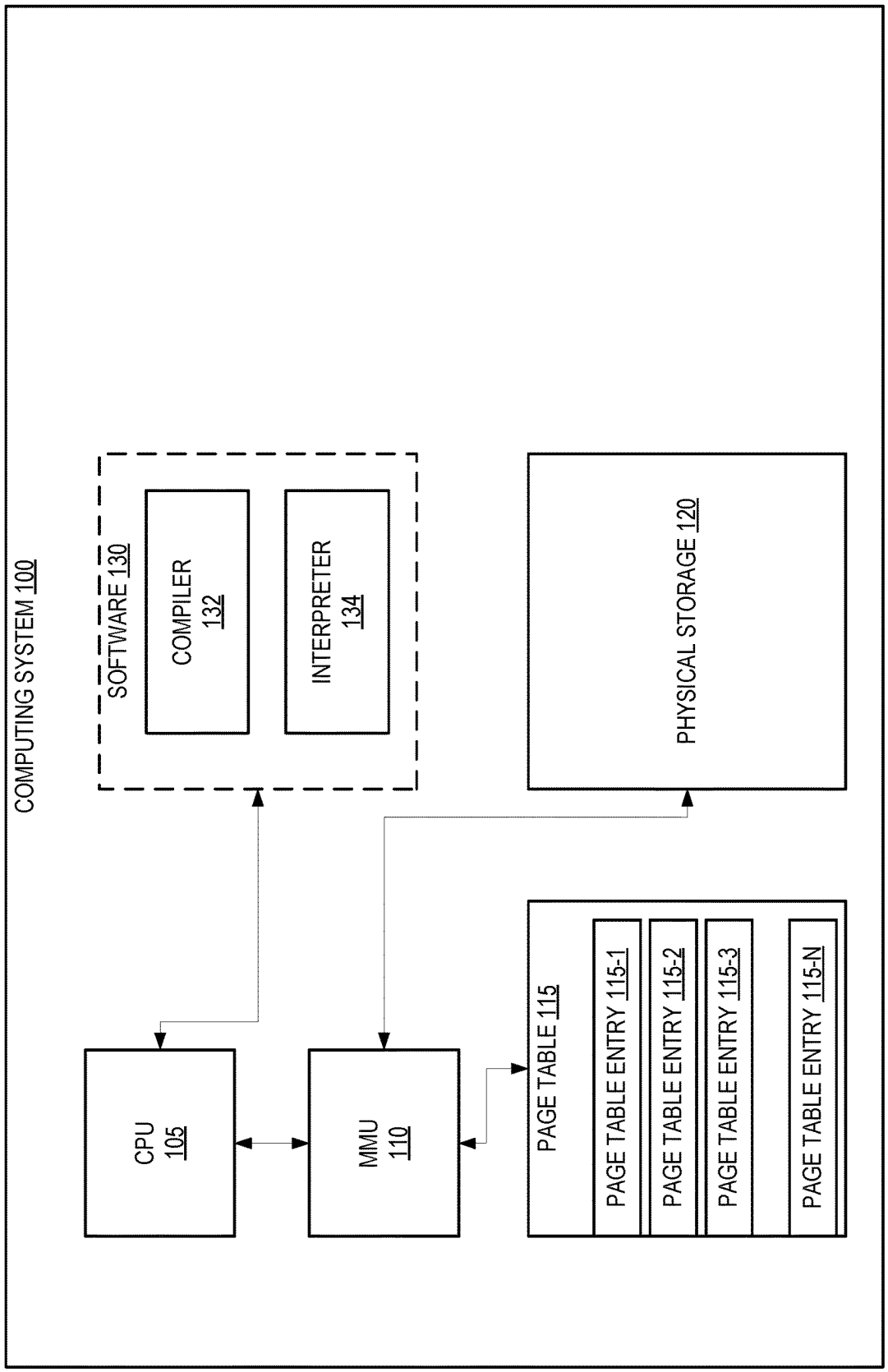
FIG. 1 depicts a high-level component diagram of an illustrated example of a computing system, in accordance with one or more aspects of the present disclosure.

Described herein are systems and methods for generating and executing a program instruction that includes a permission validation to verify that permissions specified by the instruction match permissions associated with a memory address referenced by the instruction.

In an illustrative example, a computing system may include a compiler that is employed to transform source code from a high-level programming language into object code, such as bytecode. For example, a Java compiler may transform Java source code into bytecode that may be interpreted and executed by a bytecode interpreter. In another example, the compiler may transform source code, such as C++, directly into platform-specific instructions, such as machine code, that may be stored and then executed by a central processing unit (CPU). The bytecode interpreter may be a machine-code program employed to interpret instructions formatted in bytecode and implement the required effect of those bytecode instructions in machine code.

Executable code, such as machine code, may include a sequence of specific instructions that each specify an operation to be performed. An instruction may include operands that define input and output locations for data to be processed. For example, a load instruction may include two operands, the first specifying a memory location of the data and the second specifying the target location of the data, such as a CPU register. Operands may specify the memory location of data in terms of a virtual memory address defined by the operating system. In order to retrieve data referenced by an operand in an instruction, the CPU may use a memory management unit (MMU) to translate the virtual memory address to a physical address that specifies the location of the target data stored within hardware. The MMU is employed to translate virtual memory addresses to physical addresses using an in-memory mapping table, such as a page table. The page table is a data structure used to store mapping between virtual memory addresses and physical addresses. The page table may contain mapping entries called page table entries. Each page table entry may contain a physical address that is mapped to a corresponding virtual address and a set of control flags describing properties of the data stored, access permissions of the data, and any other properties related to the state of the data.

The CPU may interact with the MMU to look up and retrieve data from an address specified by an operand of an instruction. Upon retrieving the data, the CPU may complete execution of the instruction, such as loading data from the specified memory location into a target CPU register.

The process of compiling and executing a program is not immune to exploitation. For example, attackers may exploit current memory layouts of a program by injecting code, through otherwise legitimate means such as a data read or data copy that is designed to cause buffer overflow. Buffer overflow occurs when, while writing data to a buffer location specified by a pointer, the pointer overruns the buffer boundary thus overwriting memory locations outside of the allocated buffer. Buffer overflow may be exploited by modifying the instruction pointer to reference the code that was injected. Current CPU architecture may prevent execution of injected code resulting from such buffer overflow attacks by implementing executable space protection, such as execute disable flags which mark memory locations as non-executable areas. Examples of this may include a non-execute (NX) bit or an execute disable (XD) bit, which may be used to mark memory pages as not executable.

However, implementation of execute disable flags may not be effective for all types of code executed. For example, executable code stored in the form of bytecode is recognized by the CPU as general purpose data, irrespectively of the fact that the data is later utilized by a bytecode interpreter to execute the actions indicated by the bytecode. Therefore, execute disable flags may not prevent injected bytecode from being executed by the CPU.

Accordingly, aspects of the present disclosure address the above noted deficiencies by introducing permission validations for load and store instructions to determine whether permissions associated with an operation match the permissions associated with the memory location of a memory page referenced by the instruction. Aspects of the present disclosure include utilizing an augmented load instruction by a bytecode interpreter for loading the bytecode from memory. The augmented load instruction may represent a special load instruction that includes a permission value to be compared to the memory access permissions for the source memory location prior to performing the specified load operation. If the permission value specified by the augmented load instruction matches the access permission value of the source memory location, then the CPU may perform the specified load operation by loading the contents of the source memory location into a register specified by the instruction. If however, the permission values do not match, then the CPU may trigger an exception (e.g., a page fault), thus preventing execution of an instruction.

For example, the augmented load instruction may specify the read-only load permission value. The CPU would compare the permission value specified by the augmented load instruction with the access permissions of the source memory location, and would only perform the load operation if the source memory location has read-only access permission.

In an implementation, the load instruction permission value associated with the augmented load instruction may be implemented using three two-bit permission flags. Each of the three two-bit permission flags may represent distinct permission values of read, write, and execute respectively. The three two-bit permission values may be interpreted in combination to define explicit permissions such as read-only, write-only, read/write, read/write/execute and so on. For example, a read-only permission value may be represented as a combination of the first permission flag being set to readable, the second permission flag being set to not writeable, and the third permission flag being set to not executable. In another implementation, the load instruction permission value may be configured to implement custom permission values that specify validation of other properties of the data to be loaded, such as specifying that the data stored within the memory page is bytecode.

In an implementation, each two-bit permission flag may be used to represent a tristate permission indicating either on, off, or not applicable. For instance, "on" for the two-bit read flag may indicate that the memory location is readable, "off" may represent that the read flag is not readable, and "not applicable" may indicate to the CPU that the read flag should be ignored when comparing load instruction permission against the permissions associated with a memory location.

Each of the two-bit permission flags may be implemented such that the first bit may represent whether the flag is "on" or "off." For instance, if the first bit is 1, then the first bit may represent that the permission value is "on." If the first bit is zero, then the first bit may represent that the permission value is "off." The second bit may be used to determine whether the permission flag is applicable or not. For example, if the second bit is equal to 1, then it may indicate that the permission flag is applicable, and that the value in the first bit is to be evaluated. Conversely, if the second bit is equal to 0, then it may indicate that the permission flag is not applicable and that the first bit should be ignored. The following table represents an example implementation of a readable permission value using the two-bit permission flag:

| First bit | Second bit | Outcome |
| --- | --- | --- |
| 1 (readable) | 1 (applicable) | (1, 1) = readable permission |
| 1 (readable) | 0 (not applicable) | (1, 0) = not applicable based on second bit, ignore |
| 0 (not readable) | 1 (applicable) | (0, 1) = not readable permission |
| 0 (not readable) | 0 (not applicable) | (0, 0) = not applicable based on second bit, ignore |

In an implementation, the load permission values for an augmented load instruction may be stored within instruction prefixes, preceding, or succeeding instructions within an instruction stream. The load permission values may be encoded as NOP instructions. NOP instructions may refer to a "no operation" opcode instruction that may be interpreted by a conventional CPU for debugging purposes. By using a NOP instruction, legacy CPUs which are not capable of recognizing an augmented load instruction may simply ignore the validation instructions of the augmented load instruction and treat the augmented load instruction as a traditional load instruction. By doing so, the executable program instructions may be backwards compatible with CPUs that are not currently employed to perform the permission validations specified in the augmented load instruction.

In an implementation, the CPU, when executing a program that implements the augmented load instruction, may validate the load permission value of the augmented load instruction by comparing the load permission value to a permission value associated with the memory address referenced by the augmented load instruction. The augmented load instruction may contain an operand referencing a source memory address of data to be loaded. The source memory address may be a virtual memory address. The CPU may utilize the MMU to translate the virtual memory address into a physical memory address of the hardware where the memory page is physically located. The MMU may access a page table entry that contains mapping of the virtual memory address-to-physical address. The page table entry may also include permission values associated with the memory page referenced by the page table entry. For example, each page table entry may include a read/write permission flag that indicates whether the memory page referenced by the page table entry is read-only or read/write. Prior to accessing the memory page, the MMU may be configured to compare the load instruction permission value to the permission value associated with the specific page table entry. If the load permission value matches the permission values associated with the page table entry, then the MMU accesses the target data from the memory page referenced by the page table entry in order to complete execution of the load operation by loading the data from the memory page into the target register specified by the second operand.

The described implementation provides improves security by preventing execution of malicious code that may have been injected into bytecode. For example, a pointer to bytecode to be interpreted may be modified by an attacker to specify a memory buffer which stores malicious bytecode. If the augmented load instruction specifying read-only access permission for the source memory location is used by the bytecode interpreted for loading the bytecode, the malicious bytecode would not be executed since the memory buffer which stores the malicious bytecode would not be read-only. Thus, attempting to load the malicious bytecode using the augmented load instruction would trigger a page fault thus preventing the malicious bytecode from being loaded.

In an implementation, memory access permissions may be stored by the page table. As described, a page table entry may include protections bits that may encode read, write, and execute permissions for a referenced page table. These protection bits may be used to control access to a memory page. However, permission values for page table entries may be extended and/or customized to provide a more flexible mechanism for assigning and enforcing permission values for memory pages. For instance, different permission values may be maintained using a mapping table that maps a set of memory index keys to access permission values. The memory index keys may be associated with page table entries within the page table. A separate register may be used to map specific access permissions to the memory index keys associated with page table entries. In an Intel architecture implementation, memory protection keys (MPKs) may represent memory index keys associated with the page table entries. The MPKs may be enabled by encoding into four previously unused bits in each page table entry with a MPK index value. A separate protection key register may be generated to contain mappings between the MPK index values and the appropriate access permission values associated with each key. As a result, each page table entry may be mapped to a customized permission value defined in the protection key register. In another implementation, an authority mask register (AMR) may be implemented for IBM POWER and/or OpenPOWER architectures. The AMR is a register that may contain read/write access permissions, as class numbers, for defined protection keys associated with page table entries. In yet other implementations, variations of a memory index keys may be implemented based upon the supported CPU architecture.

For the purposes of the following description, MPKs as described in the context of Intel architecture are used to describe the memory index key features. All of the memory index key features described may be implemented using other known memory index keys and registers, such as IBM POWER or any other CPU architecture. In an implementation, the load permission value in the augmented load instruction may be compared to the access permission value specified in the protection key register. Upon determining that the instruction to be executed is an augmented load instruction, the MMU may access the MPK index value specified in the page table entry associated with the memory address referenced by the augment load instruction. The MMU may then look up a access permission value in the protection key register using the MPK index value. The MMU may then compare the load instruction permission value specified from the augmented load instruction to the access permission value retrieved from the protection key register to determine whether the permission values match. If the permission values match, then the MMU accesses the target data from the memory page referenced by the page table entry and loads the data into the target register, as specified in the augmented load instruction.

In an implementation, MPKs and the protection key register allow the flexibility of generating custom permission values that may be associated with page table entries that may allow for specifying additional protections beyond the explicit read/write/execute permission values. On such custom permission value may include specifying that the data segment referenced by the page table entry is bytecode and is read-only. The augmented load instruction may then include the custom permission value of read-only plus bytecode such that upon validation, the MMU may compare the load instruction permission value of read-only plus bytecode to a custom permission value of read-only plus bytecode specified by the MPK index value and the protection key register.

Augmented instructions may not be limited to augmented load instructions. In an implementation, the CPU, when executing a program that implements an augmented instruction, may receive an augmented store instruction. The augmented store instruction may specify three operands. A first operand may specify a source memory location containing data to be stored. The source memory location may be a location of a CPU register. A second operand may specify a destination memory location, such as a virtual memory address. A third operand may specify an instruction permission value that is to be compared to a permission value associated with the memory address referenced in the second operand.

The MMU may determine the access permission value associated with the memory address referenced in the second operand by accessing a MPK index value specified by a page table entry associated with the memory address referenced by the second operand. The MMU may retrieve from the protection key register the access permission value that is mapped to the MPK index value. The MMU may then determine whether the instruction permission value specified by the third operand matches the access permission value retrieved from the protection key register. If the permission values match, then the CPU may perform the store instruction by storing the data specified in the source memory location into the destination memory location. If however, the permission values do not match, the CPU may trigger a page protection fault and may not store the data contained in the source memory location into the destination memory address. In an implementation, the instruction permission value specified by the third operand may include a write-only permission value.

In an implementation, the augmented store instruction may be implemented on a system that includes a page table with page table entries that implement read/write permission flags instead of implementing memory index keys. For example, when evaluating the instruction permission value associated with the augmented store instruction, the MMU may determine the access permission value associated with the memory address referenced in the second operand by accessing the protection bits of the associated page table entry. The MMU may then determine whether the instruction permission value specified by the third operand matches the permission values retrieved from the page table entry. If the permission values match, then the CPU may perform the store instruction by storing the data specified in the source memory location into the destination memory location. If however, the permission values do not match, the CPU may trigger a page protection fault and may not store the data contained in the source memory location into the destination memory address.

In an implementation, the compiler may be employed to generate the augmented load/store instruction instead of a simple load/store instruction. For example, the compiler may be employed to generate an augmented load instruction to be included as part of executable program code of a bytecode interpreter or other program that may be employed to load bytecode from a memory page. The compiler may receive source code to be compiled. Within the source code to be compiled, one or more lines of source code may include an annotation indicating that the load operation to be encoded is to be performed as an augmented load operation. The annotation may be a compiler specific method call, flag, or other indicator encoded to be identified by the compiler as a flag indicating an augmented load instruction is to be generated. The annotation may include parameters specifying permission values for the load instruction permission, such as read-only. Alternatively, the annotation itself may indicate the augmented load instruction and its permission value. For instance, the augmented load instruction may default to a read-only permission value, while a different annotation may be used to specify a write-only permission value for an augmented store instruction.

In an implementation, the compiler may be employed to identify specific patterns in the received source code that indicate an augmented load instruction should be generated. For example, the source code may reference a virtual function whose address is loaded from a virtual function table. The compiler may be employed to generate augmented load instructions for instructions referencing such virtual functions.

In an implementation, upon identifying that an augmented load instruction is to be generated, the compiler may be employed to generate the augmented load instruction that includes a first, second, and third operand. The first operand may specify a source memory location such as the virtual memory address of the data to be loaded. The second operand may specify a destination memory location. The destination memory location may specify a register address of where the data is to be loaded within a CPU register or other specified register. The third operand the validation permission value to be compared to the permission value associated with the page table entry for the source memory location specified by the first operand.

In an implementation, the compiler may be employed to generate an augmented store instruction instead of a simple store instruction. The compiler may receive source to be compiled. Within the source code to be compiled, one or more lines of source code may include an annotation indicating that the store operation to be encoded is to be performed as an augmented store operation. The annotation may include parameters specifying permission values for the store instruction permission, such as write-only. Alternatively, the annotation itself may indicate the augmented store instruction and its permission value. For instance, the augmented store instruction may default to a write-only permission value.

In an implementation, the compiler may generate the augmented store instruction that includes a first, second, and third operand. The first operand may specify a source memory location containing data to be stored. The second operand may specify a destination memory location, such as a virtual memory address. The third operand may specify the instruction permission value that is to be compared to a permission value associated with the memory address referenced in the second operand.

FIG. 1 depicts a high-level component diagram of an illustrated example of a computing system. Other architectures for computing system 100 are possible, and implementation of a computer system utilizing examples of the present disclosure is not limited to the specific architecture depicted by FIG. 1. As shown in FIG. 1, the computing system 100 comprises a CPU 105, MMU 110, page table 115, physical storage device 120, and software 130. It should be noted that although, for simplicity, a single CPU 105, MMU 110, page table 115, and physical storage device 120 are depicted in FIG. 1, other implementations of the computer system 100 may comprise a plurality of CPUs, MMUs, page tables, and storage devices.

In an implementation, the CPU 105 may represent a central processing unit configured to execute processing logic for performing operations and steps discussed herein. The CPU 105 may be communicatively coupled to the MMU 110. In another implementation, the MMU 110 may be a component within the CPU 105. The MMU 110 may be configured to translate virtual memory addresses to physical addresses using page table entries in the page table 115. The page table 115 may be a data structure configured to store mapping entries between virtual memory addresses and physical addresses. In an implementation, the page table 115 may be an array of page table entries 115-1-115-N. Each of the page table entries 115-1, 115-2, 115-3, 115-N may contain a physical address that is mapped to a corresponding virtual address and a set of control flags, such as a protection bit which indicates whether the memory page is read-only or read/write. Additionally, the page table entries 115-1, 115-2, 115-3, 115-N may contain bits corresponding to protection key indexes. Physical storage device 120 may be a storage device containing memory pages of data. The physical addresses mapped to page table entries 115-1-115-N may correspond to memory pages stored within the physical storage device 120.

In an implementation, software 130 may include software components such as compiler 132 and interpreter 134. Compiler 132 may be a computer program employed to transform high-level source code written in a particular computer language, into executable program instructions. For example, compiler 132 may transform source code for a bytecode interpreter program into machine code that may be executed by the CPU 105 to execute the bytecode interpreter program. Interpreter 134 may be a computer program employed to interpret the object code, such as bytecode, and translate the object code into machine code representing an executable program. The interpreter 134 may include executable program code, such as augmented load instructions and/or augmented store instructions configured to validate permission values associated with the augmented instruction against permission values associated with a referenced memory page.

Figure 2:
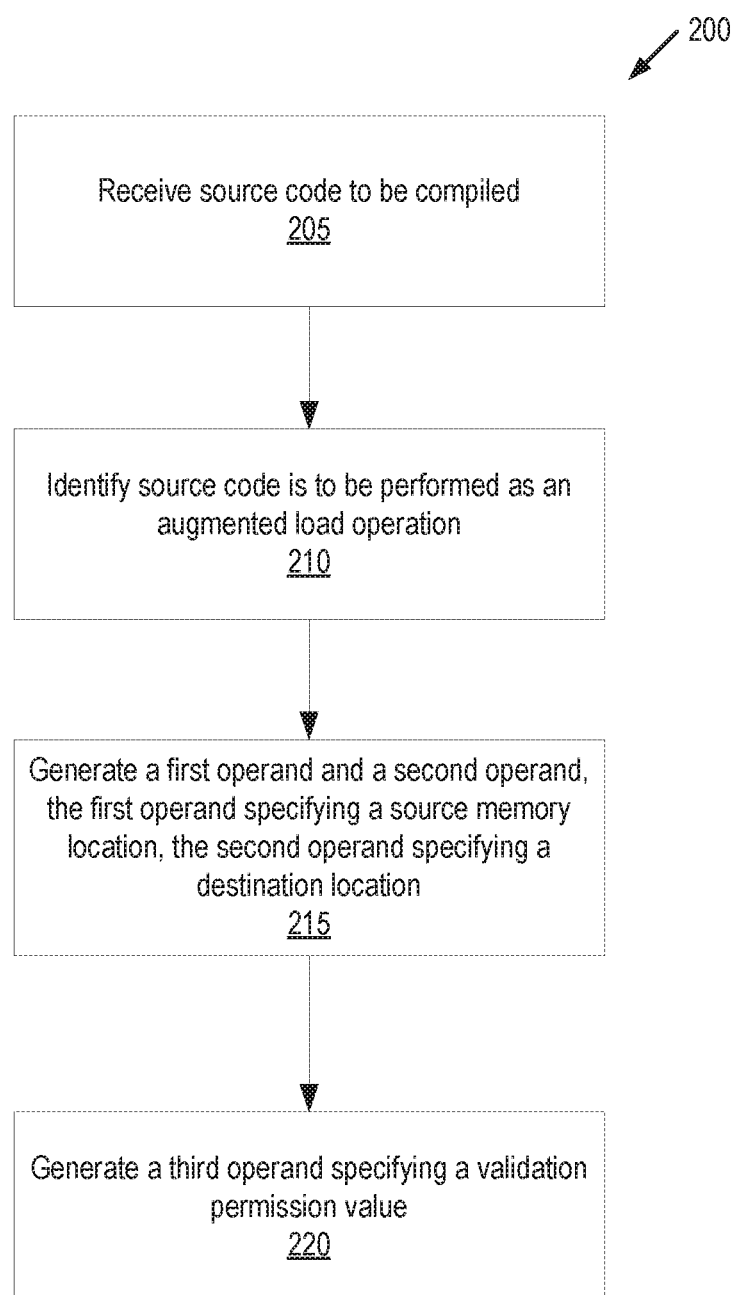
FIG. 2 depicts a flow diagram of an example method for generating an augmented load instruction from received source code, in accordance with one or more aspects of the present disclosure.

FIG. 2 depicts a flow diagram of an example method 200 for generating an augmented load instruction from received source code. The method may be performed by processing logic that may comprise hardware (circuitry, dedicated logic, etc.), computer readable instructions (run on a general purpose computer system or a dedicated machine), or a combination of both. In one illustrative example, method 200 may be performed by compiler 132 of computing system 100. Alternatively, some or all of method 200 might be performed by other modules or machines.

In an implementation, compiler 132, executing on the CPU 105, may receive source code representing a computer program, such as a bytecode interpreter or other program, or a portion of a computer program to be compiled. The source code may include a set of several lines of source code to be compiled to generate executable program instructions. In an implementation, executable program instructions generated from the received source code may not be a one-to-one correspondence. In some instances a single line of source code may correspond to one or more instructions. In other instances one or more lines of source code may correspond to a single instruction. Method 200 may represent the compiler 132 receiving one or more lines of source code from a set of source code and generating an augmented load instruction corresponding to the one or more lines of source code.

At block 205, processing logic receives source code to be compiled. In an implementation, the compiler 132, being executed on the CPU 105, may receive one or more lines of source code. At block 210, processing logic may identify that the source code received indicates that the load operation to be performed is to be an augmented load operation. In an implementation, the compiler 132 may identify one or more annotations associated with the source code that indicates that the corresponding load instruction to be generated is to be an augmented load instruction with an associated load permission value. The annotation may include, but is not limited to, a specific method call or specific parameter for a method call, a special variable, embedded information stored within a comment, or any other indicator or marker within the source code. For example, the compiler 132 may include an extension and/or enabled features that during pre-processing identify markers within comments that indicate the following lines of source code correspond to an augmented load instruction. Additionally, the annotation may include parameters specifying the load permission value to be associated with the augmented load instruction.

In another implementation, the compiler 132 may be employed with logic to identify specific patterns within source code that indicate that an augmented load instruction is to be generated. For example, the source code may reference a virtual function whose address is loaded from a virtual function table. The compiler 132 may then be employed to, upon recognizing the virtual function, generate an augmented load instruction. The augmented load instruction to be generated may include a read-only load permission value.

Responsive to identifying a load operation encoded to be performed as an augmented load operation, the compiler 132 may generate an augmented load operation comprising three operands specifying a source location for the content to be loaded, a destination address for the content, and a load instruction permission value to be validated prior to performing the load. At block 215, processing logic may generate the first operand and the second operand. In an implementation, the first operand may specify a source memory location, such as the virtual memory address of the content to be loaded. The second operand may specify the destination for the content, such as a specific CPU register or other register.

At block 220, processing logic may generate the third operand specifying the load instruction permission value to be validated prior to performing the load. In an implementation, the load instruction permission value may have been determined at block 210 when the compiler 132 identified that the source code is to generate an augmented load instruction. For example, the compiler 132 may have determined based upon either the type of source code or based on an annotation that the load instruction permission value is to be read-only. In an implementation, the third operand may be encoded in previously unused bits of an opcode instruction. For example, the load instruction permission value may be encoded as a NOP instruction as part of an instruction prefix that either precedes or succeeds load instructions within the instruction stream.

Upon compiling the set of source code and generating the corresponding platform-specific instructions, including one or more augmented load instructions and other instructions, the compiler 132 may store the platform-specific instructions within one or more memory pages in the physical storage device 120. The platform-specific instructions may be the compiled instructions for the interpreter 134 program or any other program that may implement the augmented load instruction.

Figure 3:
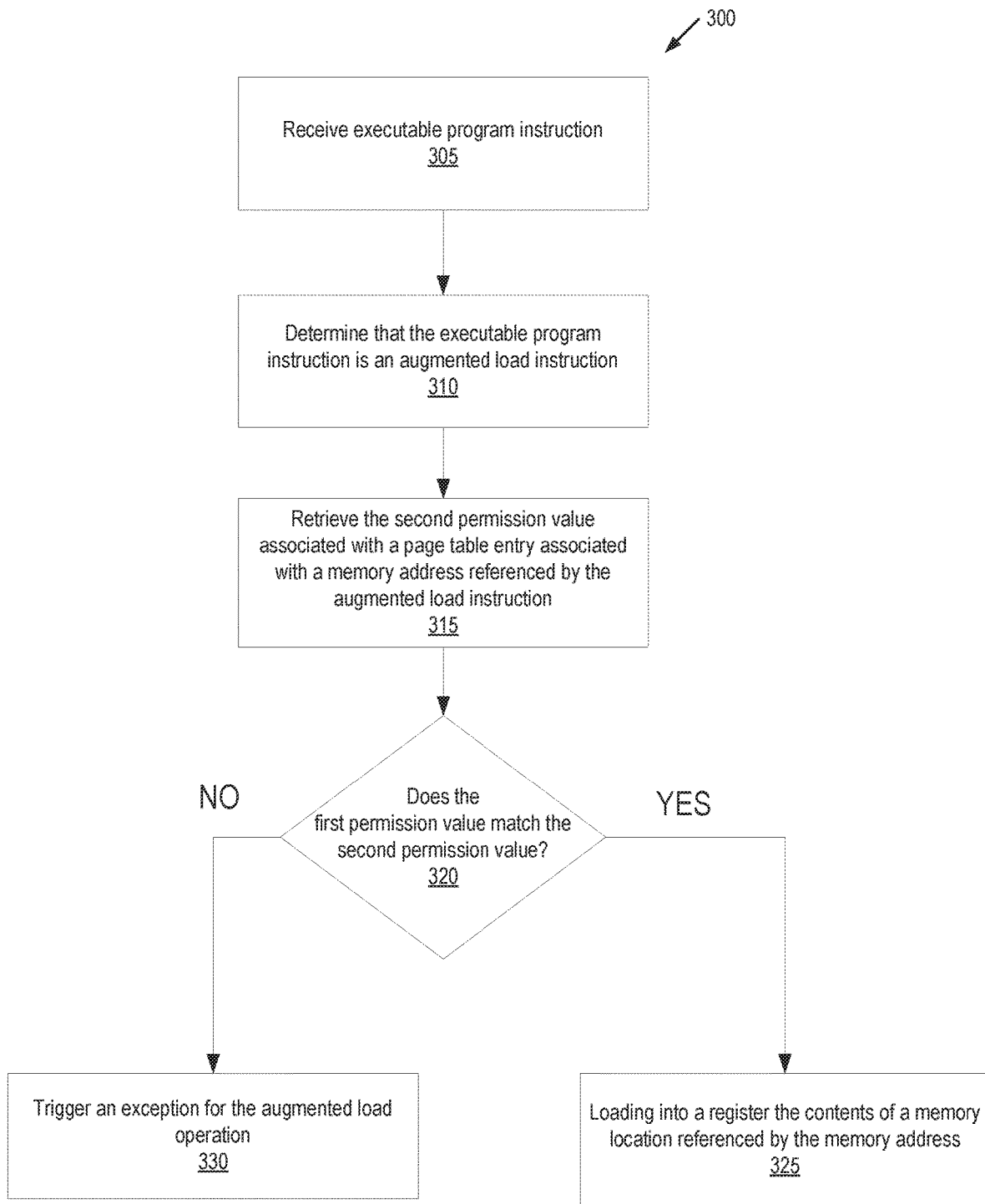
FIG. 3 depicts a flow diagram of an example method for executing an augmented load instruction, in accordance with one or more aspects of the present disclosure.
Figure 4:
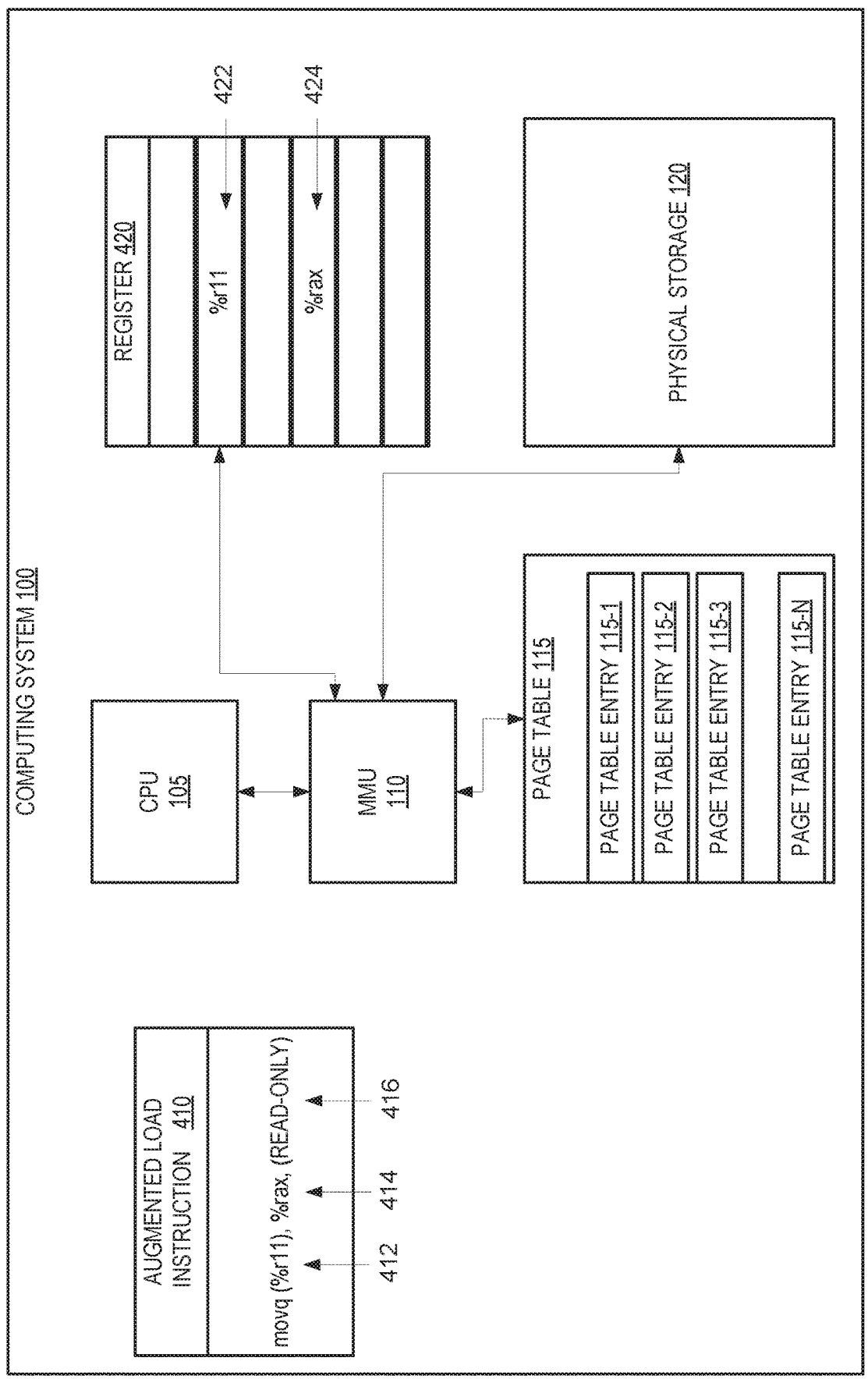
FIG. 4 depicts a block diagram of an illustrative example computing system, in accordance with one or more aspects of the present disclosure.

FIG. 3 depicts a flow diagram of an example method 300 for executing an augmented load instruction. The method may be performed by processing logic that may comprise hardware (circuitry, dedicated logic, etc.), computer readable instructions (run on a general purpose computer system or a dedicated machine), or a combination of both. In one illustrative example, method 300 may refer to the interpreter 134 executing on CPU 105 of computing system 100. Alternatively, some or all of method 300 might be performed by other modules or machines. FIG. 4 depicts a block diagram of an example computing system 400 for performing method 300.

In an implementation, interpreter 134 may be running on CPU 105 and may receive bytecode for a program to be interpreted. The interpreter 134 may be employed to read inputted bytecode instructions and translate the instructions into machine code for execution. Method 300 depicts an example of determining and executing an augmented load instruction.

At block 305, processing logic receives an executable program instruction to be executed. In an implementation, the interpreter 134 executing on the CPU 105 is a bytecode interpreter employed to perform the executable program instructions to access bytecode as part of its implementation.

At block 310, processing logic determines that the executable program instruction received is an augmented load instruction. In an implementation, the interpreter 134 may be employed to use the augmented load instruction generated by the compiler as a specific load instruction comprising a first permission value that is a load instruction permission value.

Referring to FIG. 4, augmented load instruction 410 represents an example augmented load instruction comprising three operands. Operand 412 represents the first operand which specifies the source memory location for the content to be loaded. Operand 412 depicts a reference to the source memory location as register % r11, which contains a virtual memory address for the source of the content to be loaded. Operand 414 represents the second operand which specifies the destination location for the content. Operand 414 depicts CPU register % rax as the destination location for the content. That is, the load operation specifies loading the contents of the source memory location into the % rax CPU register.

Operand 416 depicts the third operand specifying the first permission value corresponding to the load instruction permission value. Operand 416 is to be compared to a permission value associated with a page table entry for associated with the memory address referenced by the augmented load instruction. Operand 416 depicts a read-only permission value. In an implementation, the read-only permission value may be encoded as three two-bit permission flags, where each two-bit code indicates permission for read, write, and execute respectively. The three 2-bit permission flags may specify the read-only permission value as read=on, write=off, and execute=off, respectively.

Referring to FIG. 3 at block 315, processing logic retrieves a second permission value associated with a page table entry associated with a memory address referenced by the augmented load instruction. In an implementation, the CPU 105 may send to the MMU 110 the source memory address referenced by the augmented load instruction. The MMU 110 may access the page table 115 to access the page table entry 115-1 that corresponds to the source memory address. Page table entry 115-1 may contain a protection bit flag and a no execute flag that may be used to determine the explicit permissions associated with the content at the memory address associated to the page table entry 115-1. For example, the protection bit may indicate whether the content at the memory address is either read-only or read/write. If the protection bit is set to zero, then the content at the memory address is read-only. If however, the protection bit is set to one, then the content at the memory address is readable and writeable. Additionally, execute permissions may be determined based upon the no execute flag, where if the no execute flag is set to one then execute permissions are disabled.

At decision block 320, processing logic determines whether the first permission value and the second permission value match. In an implementation, the MMU 110 may compare the first permission value, which corresponds to the load instruction permission value determined from operand 416, to the second permission value, determined from the page table entry 115-1, to determine whether they match. If the permission values match, then processing logic proceeds to block 325 to load the contents of the source memory address into the destination register. If however, the permission values do not match, the processing logic proceeds to block 330 and an exception is triggered.

At block 325, processing logic loads, into the register, the contents of the memory location referenced by the source memory address. In an implementation, in response to determining that the first permission value (operand 416 which equals read-only) matches the second permission value (from page table entry 115-1), the MMU 110 may retrieve the contents from the source memory address and the CPU 105 may load the contents into the destination address. Referring to FIG. 4, the MMU may read the physical address from the page table entry 115-1 and then retrieve the contents at the physical address from the physical storage device 120. The CPU 105 may then copy the contents from the physical storage device 120 to the destination address, which is register 424 (% rax).

At block 330, processing logic triggers and exception for the augmented load operation. In an implementation, if the MMU 110 determined that the first permission value and the second permission value do not match, then the MMU 110 may notify the CPU 105 to trigger an exception. The CPU 105 may trigger a page fault exception instead of executing the augmented load operation. The page fault exception may be used to notify a user or the operating system that the load operation in the augmented load instruction does not have permission to perform the load based upon mismatched permission values.

Figure 5:
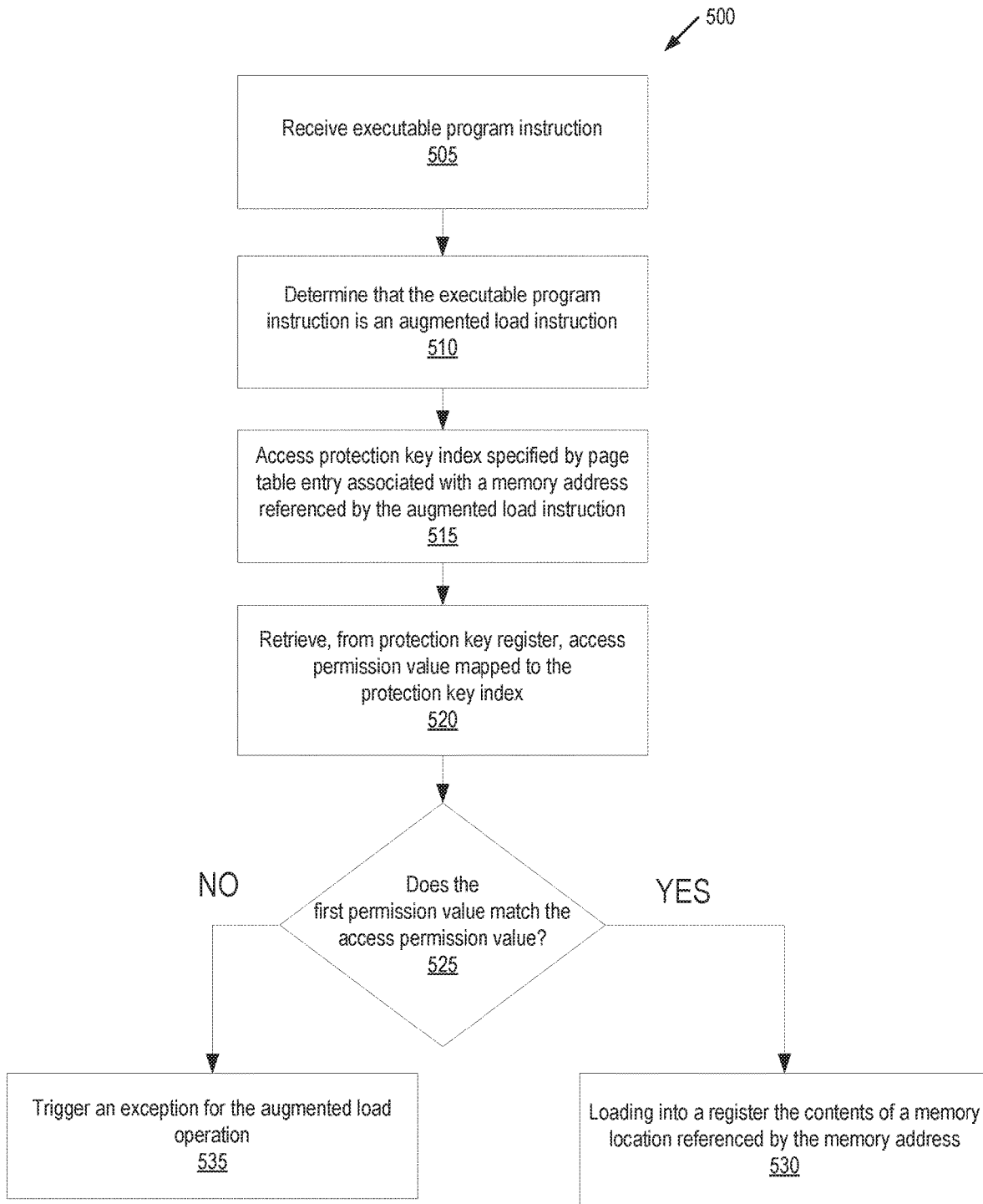
FIG. 5 depicts a flow diagram of an example method for executing an augmented load instruction where the page table implements memory protection keys, in accordance with one or more aspects of the present disclosure.
Figure 6:
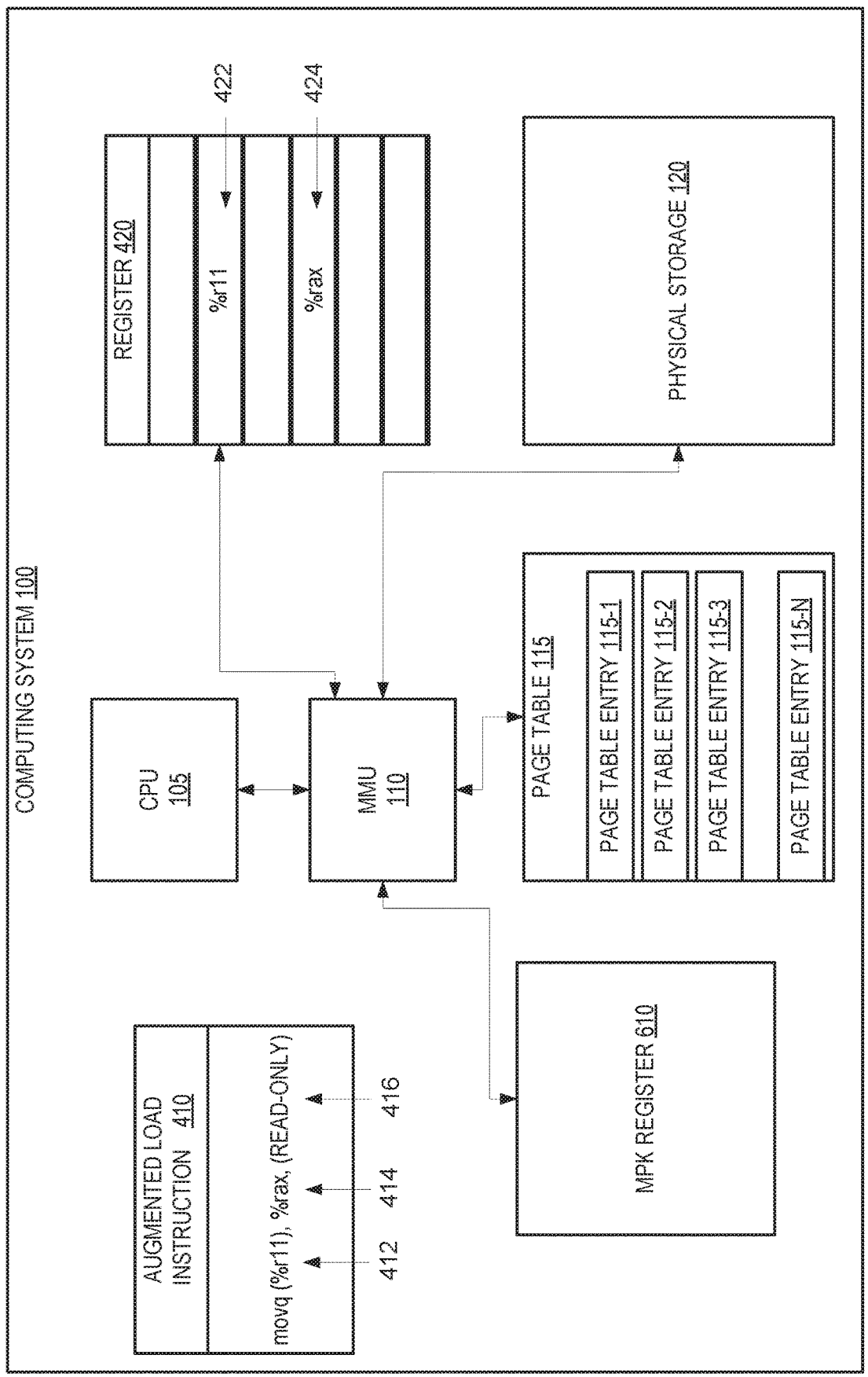
FIG. 6 depicts a block diagram of an illustrative example computing system, in accordance with one or more aspects of the present disclosure.

FIG. 5 depicts a flow diagram of an example method 500 for executing an augmented load instruction where the page table implements memory index keys. The method may be performed by processing logic that may comprise hardware (circuitry, dedicated logic, etc.), computer readable instructions (run on a general purpose computer system or a dedicated machine), or a combination of both. In one illustrative example, method 500 may refer to the interpreter 134 executing on CPU 105 of computing system 100. Alternatively, some or all of method 500 might be performed by other modules or machines. FIG. 6 depicts a block diagram of an example computing system 100 for performing method 500. The example as described in FIG. 6, implements memory index keys and a register using Intel MPKs and an MPK register. However, method 500 may be implemented using other CPU architectures and other memory index keys as described.

In an implementation, interpreter 134 may be running on CPU 105 and may receive bytecode for a program to be interpreted. The interpreter 134 may be employed to read the inputted bytecode instructions and translate the instructions into machine for execution.

At block 505, processing logic receives an executable program instruction to be executed. In an implementation, the interpreter 134 executing on the CPU 105 is a bytecode interpreter employed to perform the executable program instructions to access bytecode as part of its implementation.

At block 510, processing logic determines that the executable program instruction received is an augmented load instruction. In an implementation, the interpreter 134 may be employed to use the augmented load instruction generated by the compiler as a specific load instruction comprising a first permission value that is a load instruction permission value.

Referring to FIG. 6, augmented load instruction 410 represents an example augmented load instruction comprising three operands. Operand 412 represents the first operand which specifies the source memory location for the content to be loaded as CPU register 422 (% r11), which contains the virtual memory address for the source of the content to be loaded. Operand 414 represents the second operand which specifies the destination location for the content as CPU register 424 (% rax). Operand 416 depicts the third operand specifying the first permission value corresponding to the load instruction permission value as read-only.

Referring to FIG. 5 at block 515, processing logic accesses a protection key index specified by the page table entry associated with a memory address referenced by the augmented load instruction. In an implementation, the CPU 105 may send to the MMU 110 the source memory address referenced by the augmented load instruction. The MMU 110 may access the page table 115 to access the page table entry 115-1 that corresponds to the source memory address. Page table entry 115-1 may contain a protection key index, such as an MPK index value. The MPK index value may be stored within four previously unused bits of the page table entry. The MPK index value may be used to look up the access permission value assigned to the page table entry from the MPK register 610. In other implementations, the protection key index may represent a protection key associated with an AMR or other protection key register that maps protection key indexes to access permissions.

At block 520, processing logic retrieves the access permission value mapped to the protection key index associated for the page table entry. In an implementation, the MMU 110 accesses the MPK register 610 and retrieves the access permission value mapped to the MPK index value retrieved at block 515. The access permission value may correspond to a permission value assigned to the source memory location referenced in the augmented load instruction.

At decision block 525, processing logic determines whether the first permission value and the access permission value match. In an implementation, the MMU 110 may compare the first permission value, which corresponds to the load instruction permission value determined from operand 416, to the access permission value, retrieved from the MPK register, to determine whether there is a match. If the permission values match, then processing logic proceeds to block 530 to load the contents of the source memory address into the destination register. If however, the permission values do not match, the processing logic proceeds to block 535 and an exception is triggered.

At block 525, processing logic loads, into the register, the contents of the memory location referenced by the source memory address. In an implementation, the MMU 110 has determined that the first permission value (operand 416 which equals read-only) matches the access permission value are equal. The CPU 105 may load the contents into the destination address. Referring to FIG. 6, the MMU 110 may read the physical address from the page table entry 115-1 and then retrieve the contents at the physical address from the physical storage device 120. The CPU 110 may then copy the contents from the physical storage device 120 to the destination address, which is register 424 (% rax).

At block 535, processing logic triggers and exception for the augmented load operation. In an implementation, if the MMU 110 determined that the first permission value and the second permission value do not match, then the MMU 110 may notify the CPU 105 to trigger an exception. The CPU 105 may trigger a page fault exception instead of executing the augmented load operation. The page fault exception may be used to notify a user or the operating system that the load operation in the augmented load instruction does not have permission to perform the load based upon mismatched permission values.

Figure 7:
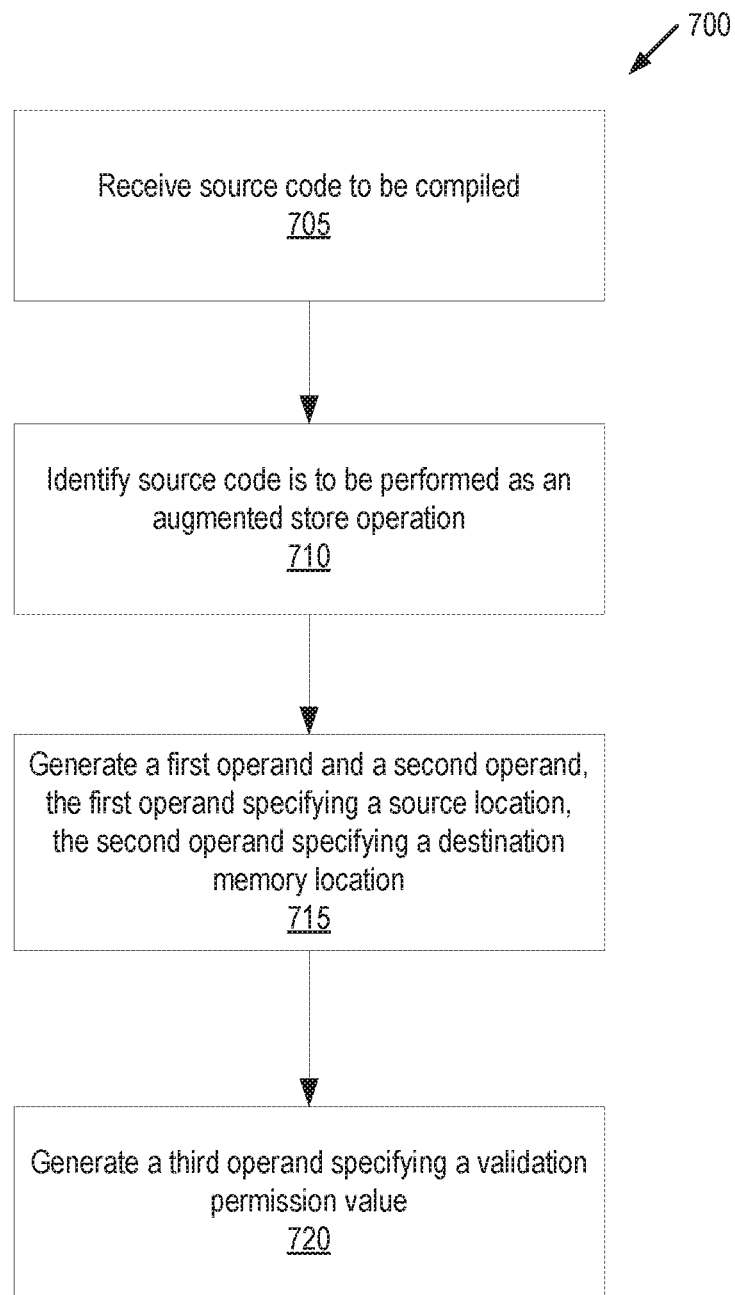
FIG. 7 depicts a flow diagram of an example method for generating an augmented store instruction from received source code, in accordance with one or more aspects of the present disclosure.

FIG. 7 depicts a flow diagram of an example method 700 for generating an augmented store instruction from received source code. The method may be performed by processing logic that may comprise hardware (circuitry, dedicated logic, etc.), computer readable instructions (run on a general purpose computer system or a dedicated machine), or a combination of both. In one illustrative example, method 700 may be performed by compiler 132 of computing system 100. Alternatively, some or all of method 700 might be performed by other modules or machines.

In an implementation, compiler 132 may receive source code representing a computer program, such as the interpreter 134 or other program, or a portion of a computer program to be compiled. The source code may include a set of several lines of source code to be compiled to generate executable program instructions. In an implementation, the executable program instructions generated from the received source code may not be a one-to-one correspondence. In some instances a single line of source code may correspond to one or more instructions. In other instances one or more lines of source code may correspond to a single instruction. Method 700 may represent the compiler 132 receiving one or more lines of source code from a set of source code and generating an augmented store instruction corresponding to the one or more lines of source code.

At block 705, processing logic receives source code to be compiled. In an implementation, the compiler 132, being executed on the CPU 105, may receive one or more lines of source code. At block 710, processing logic may identify that the source code received indicates that the store operation to be performed is to be an augmented store operation. In an implementation, the compiler 132 may identify one or more annotations associated with the source code that indicates that the corresponding store instruction to be generated is to be an augmented store instruction with an associated store permission value.

Responsive to identifying a store operation encoded to be performed as an augmented store operation, the compiler 132 may generate an augmented store operation comprising three operands specifying a source location of the content to be stored, a destination address for storing the content, and a store instruction permission value to be validated prior to performing the store. At block 715, processing logic may generate the first operand and the second operand. In an implementation, the first operand may specify a source memory location, such as a CPU register that may contain the content that is to be stored. The second operand may specify the destination memory location for storing the content. The destination memory location may refer to a memory location of a memory page within non-volatile memory.

At block 720, processing logic may generate the third operand specifying the store instruction permission value to be validated prior to performing the store. In an implementation, the store instruction permission value may have been determined at block 710 when the compiler 132 identified that the source code is to generate an augmented store instruction. For example, the compiler 132 may have determined based upon either the type of source code or based on an annotation that the store instruction permission value is to be write-only. In other examples, the compiler 132 may be employed to generate write-only permission for the store instruction permission value based upon determining that the augmented instruction is an augmented store instruction. In an implementation, the third operand may be encoded as a NOP instruction.

Upon compiling the set of source code and generating the corresponding instructions in bytecode, including one or more augmented store instructions and other instructions, the compiler 132 may store the executable program instructions within one or more memory pages in the physical storage device 120.

Figure 8:
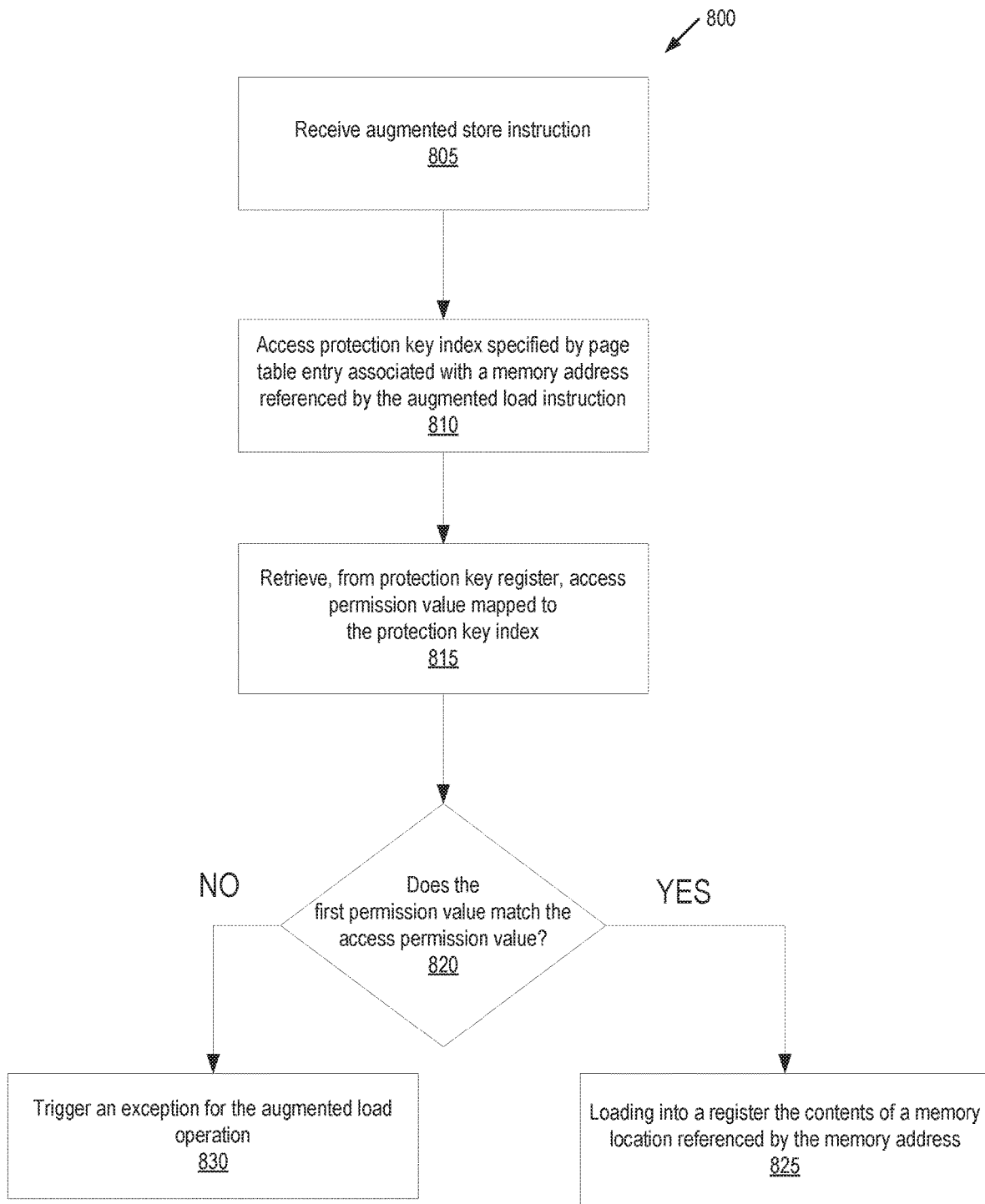
FIG. 8 depicts a flow diagram of an example method for executing an augmented store instruction where the page table implements memory protection keys, in accordance with one or more aspects of the present disclosure.
Figure 9:
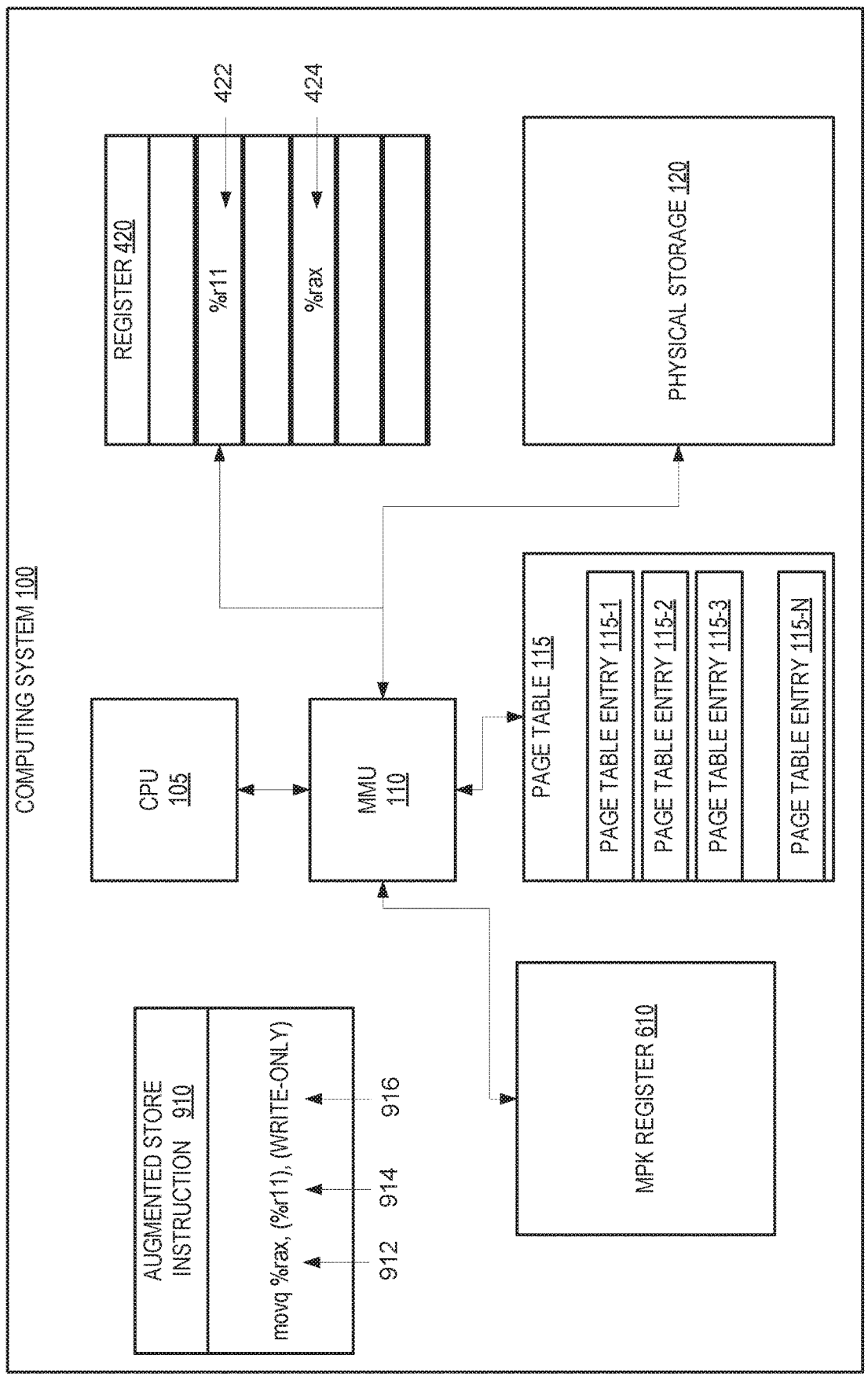
FIG. 9 depicts a block diagram of an illustrative example computing system, in accordance with one or more aspects of the present disclosure.

FIG. 8 depicts a flow diagram of an example method 800 for executing an augmented store instruction where the page table implements memory index keys. The method may be performed by processing logic that may comprise hardware (circuitry, dedicated logic, etc.), computer readable instructions (run on a general purpose computer system or a dedicated machine), or a combination of both. In one illustrative example, method 800 may refer to the interpreter 134 executing on CPU 105 of computing system 100. Alternatively, some or all of method 800 might be performed by other modules or machines. FIG. 9 depicts a block diagram of an example computing system 100 for performing method 800. The example as described in FIG. 9, implements memory index keys and a register using Intel MPKs and an MPK register. However, method 800 may be implemented using other CPU architectures and other memory index keys as described.

At block 805, processing logic receives an augmented store instruction to be executed. In an implementation, the interpreter 134 executing on the CPU 105 is a bytecode interpreter employed to perform the executable program instructions to access bytecode as part of its implementation. The augmented store instruction received may specify three operands. The first operand may specify a source memory location of the content to be stored. The source memory location may refer to a CPU register containing the content. The second operand may specify a destination memory location of where the content is to be stored, such as a memory page address. The third operand may specify a store instruction permission value to be compared to a permission value associated with the memory address referenced by the second operand.

Referring to FIG. 9, augmented store instruction 910 represents an example augmented store instruction comprising the three operands. Operand 912 represents the first operand which specifies the source location for the content to be stored as CPU register 424 (% rax), which contains the content to be stored. Operand 914 represents the second operand which specifies the destination memory address for the content as CPU register 422 (% r11). Operand 916 depicts the third operand specifying the validation permission value corresponding to the store instruction permission value as write-only.

Referring to FIG. 8 at block 810, processing logic accesses a protection key index specified by the page table entry associated with a memory address referenced by the augmented store instruction. In an implementation, the CPU 105 may send to the MMU 110 the destination memory address referenced by the augmented store instruction. The MMU 110 may access the page table 115 to access the page table entry 115-2 that corresponds to the destination memory address. Page table entry 115-2 may contain a protection key index, such as an MPK index value. The MPK index value may be stored within four previously unused bits of the page table entry. The MPK index value may be used to look up the access permission value assigned to the page table entry from the MPK register 610. Other implementations of the protection key index may represent a protection key associated with CPU architectures other than Intel, such as IBM.

At block 815, processing logic retrieves the access permission value mapped to the protection key index associated for the page table entry 115-2. In an implementation, the MMU 110 accesses the MPK register 610 and retrieves the access permission value mapped to the MPK index value retrieved at block 810. The access permission value may correspond to a permission value assigned to the destination memory location referenced in the augmented store instruction.

At decision block 820, processing logic determines whether the validation permission value and the access permission value match. In an implementation, the MMU 110 may compare the validation permission value, which corresponds to the store instruction permission value determined from operand 416, to the access permission value, retrieved from the MPK register, to determine whether there is a match. If the permission values match, then processing logic proceeds to block 825 to store the contents of the source memory address into the destination memory address. If however, the permission values do not match, the processing logic proceeds to block 830 and an exception is triggered.

At block 825, processing logic stores, into the data segment corresponding to the destination memory address, the contents of the source memory location referenced by the first operand. In an implementation, in response to determining that the validation permission value (operand 816 which equals write-only) matches the access permission value, the CPU 105 stores the contents of the source memory into the destination memory address. Referring to FIG. 9, the MMU 110 may read the physical address from the page table entry 115-2 and then retrieve the contents from the source register (register 424) and the CPU 105 may then copy the contents to the physical address specified from the page table entry 115-2.

At block 830, processing logic triggers and exception for the augmented store operation. In an implementation, if the MMU 110 determined that the validation permission value and the access permission value do not match, then the MMU 110 may notify the CPU 105 to trigger an exception. The CPU 105 may trigger a page fault exception instead of executing the augmented store operation. The page fault exception may be used to notify a user or the operating system that the store operation in the augmented store instruction does not have permission to perform the store based upon mismatched permission values.

Figure 10:
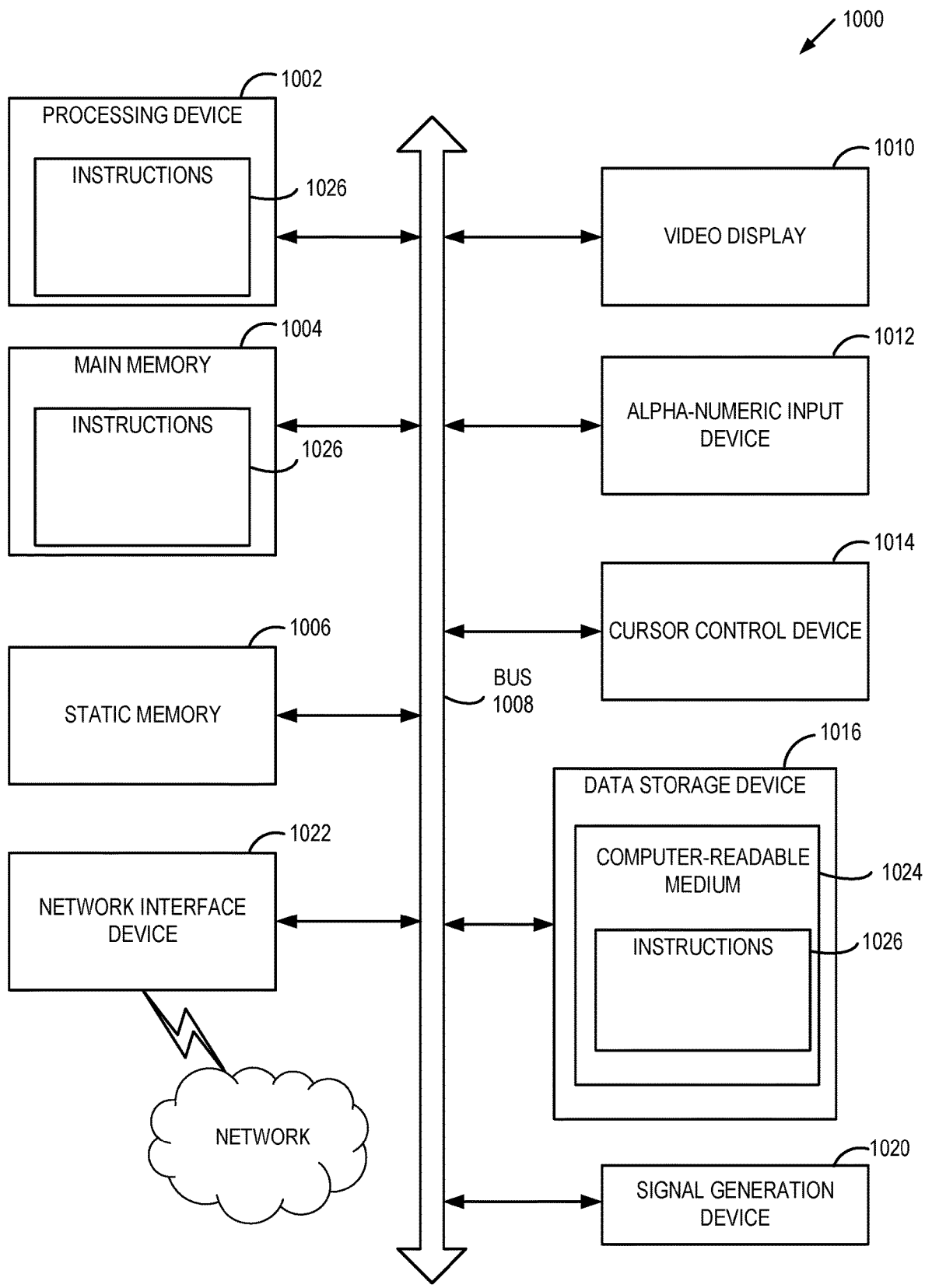
FIG. 10 depicts a block diagram of an illustrative computer system operating in accordance with embodiments of the disclosure.

FIG. 10 depicts an illustrative computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The illustrative computer system 1000 includes a processing system (processor) 1002, a main memory 1004 (e.g., read-only memory (ROM), flash memory, dynamic random access memory (DRAM) such as synchronous DRAM (SDRAM)), a static memory 1006 (e.g., flash memory, static random access memory (SRAM)), and a data storage device 1016, which communicate with each other via a bus 1008.

Processor 1002 represents one or more general-purpose processing devices such as a microprocessor, central processing unit, or the like. More particularly, the processor 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1002 may also be one or more special-purpose processing devices such as an application specific integrated circuit (ASIC), a field programmable gate array (FPGA), a digital signal processor (DSP), network processor, or the like. The processor 1002 is configured to execute instructions 1026 for performing the operations and steps discussed herein.

The computer system 1000 may further include a network interface device 1022. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1020 (e.g., a speaker).

The data storage device 1016 may include a computer-readable medium 1024 on which is stored one or more sets of instructions 1026 (e.g., instructions corresponding to the methods of FIGS. 2 and 3, etc.) embodying any one or more of the methodologies or functions described herein. Instructions 1026 may also reside, completely or at least partially, within the main memory 1004 and/or within the processor 1002 during execution thereof by the computer system 1000, the main memory 1004 and the processor 1002 also constituting computer-readable media. Instructions 1026 may further be transmitted or received over a network via the network interface device 1022.

While the computer-readable storage medium 1024 is shown in an illustrative embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing description, numerous details have been set forth. It will be apparent, however, to one skilled in the art, that embodiments of the present disclosure may be practiced without these specific details. In some instances, well-known structures and devices are shown in block diagram form, rather than in detail, in order to avoid obscuring the present disclosure.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the foregoing discussion, it is appreciated that throughout the description, discussions utilizing terms such as "executing", "determining", "receiving", "copying", "mapping", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. In addition, embodiments of the present disclosure are not described with reference to any particular programming language. It will be appreciated that a variety of programming languages may be used to implement the teachings of the disclosure as described herein.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus. Embodiments of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

Other computer system designs and configurations may also be suitable to implement the systems and methods described herein. The following examples illustrate various implementations in accordance with one or more aspects of the present disclosure.

Example 1 is a method comprising receiving, by a central processing unit (CPU), an executable program instruction; determining that the executable program instruction is an augmented load instruction; and responsive to determining that a first permission value specified by the augmented load instruction matches a second permission value associated with a page table entry associated with a memory address referenced by the augmented load instruction, loading, into a register, contents of a memory location referenced by the memory address.

Example 2 is a method of example 1, further comprising: responsive to determining that the first permission value specified by the augmented load instruction does not match the second permission value associated with the page table entry, triggering an exception for the augmented load instruction.

Example 3 is a method of example 1, wherein the first permission value comprises a two-bit read flag, a two-bit write flag, and a two-bit execute flag, each configured to encode values of either: true, false, or not applicable.

Example 4 is a method of example 1, wherein the first permission value specified by the augmented load instruction comprises a read-only permission value.

Example 5 is a method of example 1, wherein the second permission value associated with the page table entry comprises a read/write permission flag indicating whether the memory referenced by the memory address is read-only or read and write.

Example 6 is a method of example 5, wherein the first permission value specified by the augmented load instruction comprises a read-only permission value; and wherein determining whether the first permission value specified in the augmented load instruction matches the second permission value associated with the page table entry comprises determining that the read/write permission flag is set to zero.

Example 7 is a method of example 1, wherein the executable program code implements a bytecode interpreter.

Example 8 is a system comprising: a memory; and a processor operatively coupled to the memory, to execute a compiler to: receive source code to be compiled; generate, in view of the source code, an augmented load instruction comprising a first operand specifying a source memory location, a second operand specifying a destination memory location, and a third operand specifying a validation permission value to be compared to a permission value associated with a page table entry for the source memory location.

Example 9 is a system of example 8, wherein the validation permission value specifies a read-only permission.

Example 10 is a system of example 9, wherein the validation permission value further specifies that a data segment referenced by the page table entry comprises executable bytecode.

Example 11 is a system of example 8, wherein generating the augmented load instruction is performed responsive to identifying an augmented load annotation associated with a part of the source code.

Example 12 is a system of example 8, wherein generating the augmented load instruction is performed responsive to identifying that the source code references a virtual function indicating that a load operation encoded by the source code is to be performed as an augmented load operation.

Example 13 is a non-transitory computer readable storage medium, having instructions stored therein, which when executed by a processing device of a computer system, cause the processing device to: receive, by a central processing unit (CPU), an executable program instruction; determine that the executable program instruction is an augmented load instruction, wherein the augmented load instruction specifies a first permission value; access a protection key index specified by a page table entry associated with a memory address referenced by the augmented load instruction; retrieve, from a protection key register, an access permission value mapped to the protection key index; determine whether the first permission value specified by the augmented load instruction matches the access permission value; and responsive to determining that the first permission value matches the access permission value, load, into a register, contents of a memory location referenced by the memory address.

Example 14 is a non-transitory computer readable storage medium of example 13, wherein the processing device is further to: responsive to determining that the first permission value does not match the access permission value, trigger an exception for the augmented load instruction.

Example 15 is a non-transitory computer readable storage medium of example 13, wherein the first permission value comprises a two-bit read flag, a two-bit write flag, and a two-bit execute flag, each configured to encode values of either: true, false, or not applicable.

Example 16 is a non-transitory computer readable storage medium of example 13, wherein the access permission value mapped to the protection key index comprises a read-only permission value.

Example 17 is a non-transitory computer readable storage medium of example 13, wherein the first permission value specified by the augmented load instruction is a custom permission value specifying that a data segment referenced by the page table entry comprises executable bytecode and is read-only; and wherein the access permission value mapped to the protection key index is a custom permission value specifying that the data segment comprises executable bytecode and is read-only.

Example 18 is a non-transitory computer readable storage medium of example 13, wherein the executable program instruction implements a bytecode interpreter.

Example 19 is a non-transitory computer readable storage medium of example 13, wherein the protection key index is a memory protection key index value and the protection key register is a memory protection key register.

Example 20 is a method comprising: receiving, by a central processing unit (CPU), an augmented store instruction, wherein the augmented store instruction comprises a first operand specifying a source memory location, a second operand specifying a destination memory location, and a third operand specifying an access permission value to be compared to a permission value associated with a memory address referenced by the second operand; accessing a protection key index specified by a page table entry associated with a memory address referenced by the augmented store instruction; retrieving, from a protection key register, the access permission value mapped to the protection key index; determining whether the validation permission value matches the access permission value mapped to the protection key index; and responsive to determining that the validation permission value specified by the augmented store instruction matches the access permission value, storing into a data segment associated with the memory address, contents specified by the store instruction.

Example 21 is a method of example 20, further comprising: responsive to determining that the validation permission value does not match the access permission value, triggering an exception for the augmented store instruction.

Example 22 is a method of example 20, wherein the validation permission value specified in the augmented store instruction comprises a write-only permission value.

Example 23 is a method of example 20, wherein the access permission value mapped to the protection key index comprises a write-only permission value.

Example 24 is a method of example 20, wherein the augmented store instruction implements a bytecode interpreter.

Example 25 is a method of example 20, wherein the protection key index is a memory protection key index value and the protection key register is a memory protection key register.

Example 26 is a method comprising: receiving, by a compiler running on a computing system, source code to be compiled; and generating, by the compiler in view of the source code, an augmented store instruction comprising a first operand specifying a source register, a second operand specifying a destination memory location, and a third operand specifying a validation permission value to be compared to a permission value associated with a page table entry associated with the memory address referenced by the augmented store instruction.

Example 27 is a method of example 26, wherein the validation permission value specifies a write-only permission.

Example 28 is a method of example 26, further comprising: identifying an augmented store annotation associated with a part of the source code.

What is claimed is:
1. A method comprising:
receiving, by a central processing unit (CPU), a first executable program instruction referencing a first memory address, wherein the first executable program instruction is a first augmented load instruction comprising a first permission value;

responsive to receiving the first augmented load instruction, comparing, by the CPU, the first permission value to a second permission value, wherein the second permission value is associated with a first page table entry for the first memory address; and responsive to determining that the first permission value matches the second permission value, loading, into a register, contents of a memory location referenced by the first memory address.

2. The method of claim 1, further comprising:

receiving, by the central processing unit (CPU), a second executable program instruction referencing a second memory address, wherein the second executable program instruction is a second augmented load instruction comprising a third permission value;

responsive to receiving the second augmented load instruction, comparing, by the CPU, the third permission value to a fourth permission value, wherein the fourth permission value is associated with a second page table entry for the second memory address; and responsive to determining that the third permission value specified by the second augmented load instruction does not match the fourth permission value associated with the second page table entry, triggering an exception for the second augmented load instruction.

3. The method of claim 1, wherein the first permission value comprises a two-bit read flag, a two-bit write flag, and a two-bit execute flag, each configured to encode values of either: true, false, or not applicable.

4. The method of claim 1, wherein the first permission value comprises a read-only permission value.

5. The method of claim 1, wherein the second permission value associated with the page table entry comprises a read/write permission flag indicating whether the memory referenced by the memory address is read-only or read and write.

6. The method of claim 5, wherein the first permission value comprises a read-only permission value; and wherein determining whether the first permission value specified in the augmented load instruction matches the second permission value associated with the page table entry comprises determining that the read/write permission flag is set to zero.

7. The method of claim 1, wherein the first executable program instruction is a part of implements a bytecode interpreter.

* * * * *